US00RE45353E

(19) United States
(12) Reissued Patent
Peker

(10) Patent Number: US RE45,353 E
(45) Date of Reissued Patent: Jan. 27, 2015

(54) METHOD OF MAKING DENSE COMPOSITES OF BULK-SOLIDIFYING AMORPHOUS ALLOYS AND ARTICLES THEREOF

(75) Inventor: Atakan Peker, Spokane, WA (US)

(73) Assignee: Crucible Intellectual Property, LLC, Rancho Santa Margarita, CA (US)

(21) Appl. No.: 13/183,149

(22) Filed: Jul. 14, 2011

Related U.S. Patent Documents

Reissue of:
(64) Patent No.: 7,560,001
Issued: Jul. 14, 2009
Appl. No.: 10/521,424
PCT Filed: Jul. 17, 2003
PCT No.: PCT/US03/22522
§ 371 (c)(1),
(2), (4) Date: Aug. 12, 2005
PCT Pub. No.: WO2004/007786
PCT Pub. Date: Jan. 22, 2004

U.S. Applications:
(60) Provisional application No. 60/397,981, filed on Jul. 17, 2002.

(51) Int. Cl.
*C22C 1/02* (2006.01)
*C22C 45/10* (2006.01)
*C22C 47/12* (2006.01)
*C22C 1/00* (2006.01)

(52) U.S. Cl.
CPC ..... *C22C 1/002* (2013.01); *C22C 47/12* (2013.01)
USPC ..... 148/538; 148/561; 164/65; 164/461

(58) Field of Classification Search
USPC ..... 148/403, 421, 538, 561; 428/367, 375, 428/378, 379, 389, 457, 469, 698, 701, 702, 428/704
See application file for complete search history.

(56) References Cited

U.S. PATENT DOCUMENTS

| | | | | |
|---|---|---|---|---|
| 2,106,145 | A | 4/1938 | Floraday | 362/490 |
| 2,124,538 | A | 7/1938 | Boyer | 75/10.65 |
| 3,322,546 | A | 5/1967 | Tanzman et al. | 75/255 |
| 3,539,192 | A | 11/1970 | Prasse | 277/444 |
| 3,776,297 | A | 12/1973 | Williford et al. | 164/461 |
| 3,948,613 | A | 4/1976 | Weill | 428/601 |
| 3,970,445 | A | 7/1976 | Gale et al. | 420/64 |
| 3,986,867 | A | 10/1976 | Masumoto et al. | 148/403 |
| 3,986,892 | A | 10/1976 | Ewe et al. | 429/218.1 |
| 4,024,902 | A | 5/1977 | Baum | 164/97 |
| 4,067,732 | A | 1/1978 | Ray | 148/403 |

(Continued)

FOREIGN PATENT DOCUMENTS

| | | | |
|---|---|---|---|
| DE | 010237992 | A1 | 3/2003 |
| DE | 010237992 | A1 * | 3/2003 |

(Continued)

OTHER PUBLICATIONS

Author Unknown, "Standard Practice for Conducting Dry Sand/Rubber Wheel Abrasion Tests", Designation G 65-81, source unknown, date unknown, pp. 351-368.*

(Continued)

*Primary Examiner* — George Wyszomierski
(74) *Attorney, Agent, or Firm* — Pillsbury Winthrop Shaw Pittman LLP

(57) ABSTRACT

A method of making composites of bulk-solidifying amorphous alloys, and articles made thereof, containing at least one type or reinforcement material, wherein the composite material preferably comprises a high volume fraction of reinforcement material and is fully-dense with minimum porosity are provided.

30 Claims, 4 Drawing Sheets

(56) References Cited

U.S. PATENT DOCUMENTS

| | | | | | |
|---|---|---|---|---|---|
| 4,124,472 | A | | 11/1978 | Riegert | 204/192.16 |
| 4,125,737 | A | | 11/1978 | Andersson | 372/72 |
| 4,163,071 | A | | 7/1979 | Weatherly et al. | 427/451 |
| 4,260,416 | A | | 4/1981 | Kavesh et al. | 148/403 |
| 4,268,567 | A | | 5/1981 | Harmony | 428/195.1 |
| 4,330,027 | A | | 5/1982 | Narasimhan | 164/461 |
| 4,374,900 | A | | 2/1983 | Hara et al. | 428/551 |
| 4,381,943 | A | | 5/1983 | Dickson et al. | 75/356 |
| 4,396,820 | A | | 8/1983 | Puschner | 219/121.14 |
| 4,409,296 | A | | 10/1983 | Ward | 428/610 |
| 4,482,612 | A | | 11/1984 | Kuroki et al. | 428/683 |
| 4,487,630 | A | | 12/1984 | Crook et al. | 420/36 |
| 4,488,882 | A | | 12/1984 | Dausinger et al. | 51/295 |
| 4,499,158 | A | | 2/1985 | Onuma et al. | 428/682 |
| 4,515,870 | A | | 5/1985 | Bose et al. | 428/656 |
| 4,523,621 | A | * | 6/1985 | Ray | 164/46 |
| 4,523,625 | A | | 6/1985 | Ast | 164/461 |
| 4,526,618 | A | | 7/1985 | Keshavan et al. | 106/1.05 |
| 4,557,981 | A | | 12/1985 | Bergmann | 428/627 |
| 4,564,396 | A | | 1/1986 | Johnson et al. | 148/561 |
| 4,585,617 | A | | 4/1986 | Tenhover et al. | 419/5 |
| 4,612,059 | A | | 9/1986 | Mori et al. | 148/525 |
| 4,621,031 | A | * | 11/1986 | Scruggs | 428/627 |
| 4,656,099 | A | | 4/1987 | Sievers | 428/610 |
| 4,668,310 | A | | 5/1987 | Kudo et al. | 148/304 |
| 4,710,236 | A | * | 12/1987 | Schultz | 419/33 |
| 4,725,312 | A | * | 2/1988 | Seon et al. | 420/416 |
| 4,725,512 | A | | 2/1988 | Scruggs | |
| 4,731,253 | A | | 3/1988 | DuBois | 427/451 |
| 4,741,974 | A | | 5/1988 | Longo et al. | 428/558 |
| 4,762,677 | A | * | 8/1988 | Dolgin | 419/11 |
| 4,770,701 | A | | 9/1988 | Henderson et al. | 75/232 |
| 4,810,850 | A | | 3/1989 | Tenkula et al. | 219/146.1 |
| 4,960,643 | A | | 10/1990 | Lemelson | 428/408 |
| 5,127,969 | A | | 7/1992 | Sekhar | 148/23 |
| 5,189,252 | A | | 2/1993 | Huffman et al. | 102/459 |
| 5,288,344 | A | | 2/1994 | Peker et al. | 148/403 |
| 5,294,462 | A | | 3/1994 | Kaiser et al. | 427/446 |
| 5,368,659 | A | | 11/1994 | Peker et al. | 148/403 |
| 5,380,349 | A | | 1/1995 | Taniguchi et al. | 65/286 |
| 5,440,995 | A | | 8/1995 | Levitt | 102/517 |
| 5,482,577 | A | | 1/1996 | Hashimoto et al. | 148/403 |
| 5,543,187 | A | | 8/1996 | Errico et al. | |
| 5,567,251 | A | | 10/1996 | Peker et al. | 148/522 |
| 5,567,532 | A | | 10/1996 | Peter et al. | 428/457 |
| 5,648,174 | A | | 7/1997 | Yamagata et al. | |
| 5,735,975 | A | | 4/1998 | Lin et al. | 148/403 |
| 5,866,254 | A | * | 2/1999 | Peker et al. | 428/378 |
| 5,868,254 | A | * | 2/1999 | Price et al. | 206/736 |
| 6,010,580 | A | | 1/2000 | Dandliker et al. | 148/403 |
| 6,183,889 | B1 | | 2/2001 | Koshiba et al. | 428/812 |
| 6,218,029 | B1 | | 4/2001 | Rickerby | 428/615 |
| 6,325,868 | B1 | | 12/2001 | Kim et al. | 148/403 |
| 6,326,295 | B1 | | 12/2001 | Figura | 438/622 |
| 6,669,899 | B2 | * | 12/2003 | Bae et al. | 419/38 |
| 2002/0036034 | A1 | | 3/2002 | Xing et al. | 148/561 |
| 2003/0140987 | A1 | * | 7/2003 | Bae et al. | 148/403 |
| 2005/0084407 | A1 | * | 4/2005 | Myrick | 419/66 |

FOREIGN PATENT DOCUMENTS

| | | | | |
|---|---|---|---|---|
| GB | 2005302 | | | 4/1979 |
| GB | 2005302 | A | * | 4/1979 |
| JP | 56-112449 | | | 9/1981 |
| JP | 56-112449 | A | * | 9/1981 |
| WO | WO00/68469 | A2 | | 11/2000 |
| WO | WO-00/69469 | A2 | * | 11/2000 |
| WO | WO03/040422 | A1 | | 5/2003 |
| WO | WO-03/040422 | A1 | * | 5/2003 |

OTHER PUBLICATIONS

Author Unknown, "A World of Superabrasives Experience At Your Service", source unknown, date unknown, 4 pgs.*

Author Unknown, "GE Superabrasives—The Resin Bond System", source unknown, date unknown, 1 pg.*

Author Unknown, "GE Superabrasives—Micron Powders", source unknown, date unknown, 1 pg.*

Author Unknown, "GE Superabrasives—The MBS 700 Series Product Line", source unknown, date unknown, 2 pgs.*

Author Unknown, "GE Superabrasives—The MBS 900 Series Product Line", source unknown, date unknown, 2 pgs.*

Bian, Z. et al., "Carbon-nanotube-reinforced Zr52.5 Cu17.9 Ni14.6 Al10 Ti5 bulk metallic glasss composites", Applied Physics Letters, vol. 81, No. 25, Dec. 2002.*

Conner, R.D., "Mechanical properties of tungsten and steel fiber reinforced Zr41.25 Ti13.75 Cu12.5 Ni10 Be22.5 metallic glass matrix composites", Acta Mater., vol. 46, No. 17, pp. 6089-6102, 1998.*

Koch et al., "Preparation of 'Amorphous' Ni60 Nb40 by Mechanical Alloying", Appl. Phys. Lett., vol. 43, No. 11, pp. 1017-1019, Dec. 1983.*

Masumoto, "Recent Progress in Amorphous Metallic Materials in Japan", Materials Science and Engineering, vol. A179/A180, pp. 8-16, 1994.*

Qiu, K.Q. et al., "Melt infiltration casting of Zr57 Al10 Nb5 Cu15.4 Ni12.6 amorphous matrix composite", Journal of Minerals & Materials Charactrization & Engineering, vol. 3, No. 2, pp. 91-98, 2004.*

Suresh, S. et al., Fundamentals of Metal-Matrix Composites, Chapter 1: Liquid State Processing, 1993, Butterworth-Heinemann, pp. 3-7 and 17-18.*

Szuecs, F. et al., Mechanical Properties of Zr56.2 Ti13.8 Nb5.0 Cu6.9 Ni5.6 Be12.5 ductile phase reinforced bulk metallic glass composite, Acta Mater., vol. 49, pp. 1507-1513, 2001.*

Kuhn, U. et al., "As-cast quasicrystalline phase in a Zr-based multicomponent bulk alloy", Applied Physics Letters, vol. 77, No. 22, pp. 3176-3178, Nov. 13, 2000.*

ASM Committee on Tooling Materials, "Superhard Tool Materials", Metals Handbook, Ninth Edition, vol. 3: Properties and Selection: Stainless Steels, Tool Materials and Special Purpose Metals, American Society for Metals, 1980, pp. 448-465, title page and copyright page.

* cited by examiner

METHOD OF MAKING DENSE COMPOSITES OF BULK-SOLIDIFYING AMORPHOUS ALLOYS AND ARTICLES THEREOF

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is a National Stage of International Application No. PCT/US2003/22522 filed on Jul. 17, 2003 which claims the benefit of U.S. Provisional Application No. 60/397,981, filed Jul. 17, 2002.

FIELD OF INVENTION

The present invention relates to a method of making composites of bulk-solidifying amorphous alloys and articles made thereof; and more particularly to a method of producing a bulk-solidifying amorphous composite having a high volume fraction of reinforcement material therein.

BACKGROUND OF THE INVENTION

Bulk solidifying amorphous alloys are a recently discovered family of amorphous alloys, which can be cooled at substantially lower cooling rates, of about 500 K/sec or less, and retain their amorphous atomic structure substantially. As such, they can be produced in thickness of 1.0 mm or more, substantially thicker than conventional amorphous alloys, which have typical thicknesses of 0.020 mm and which require cooling rates of $10^5$ K/sec or more.

Because of their improved properties, bulk-solidifying amorphous alloys have been found to be a useful matrix material for a variety of reinforcement material, including composite materials. Such composite materials and methods of making such composite materials have been disclosed, for example, U.S. Pat. Nos. 5,567,251; 5,866,254; 5,567,532; and 6,010,580.

However, the processing of such bulk-solidifying amorphous composites with high volume fractions of reinforcement material poses some challenges and hinders the development and use of such composites. For example, thus far composite articles made with bulk-solidifying amorphous materials have typically limited to materials where the volume fraction of particulate reinforcement material is less than 75%. In addition, it has proven difficulty to produce a composite bulk-solidifying amorphous material having a high volume fraction of fine carbon fiber reinforcement material.

Accordingly, a need exists to produce a fully dense bulk-solidifying amorphous composite having a high volume fraction of reinforcement material therein.

SUMMARY OF THE INVENTION

The current invention is directed to a method of making composites of bulk-solidifying amorphous alloys, and articles made thereof, containing at least one type of reinforcement material, wherein the composite material preferably comprises a high volume fraction of reinforcement material and is fully-dense with minimum porosity by performing the steps of the process required to retain the amorphous phase and/or form near-to-net shape articles only after the composite material has been densified.

In one embodiment the bulk solidifying amorphous alloys comprise materials selected from the group described by the molecular equation: $(Zr,Ti)_a(Ni,Cu,Fe)_b(Be,Al,Si,B)_c$, where a is in the range of from 30 to 75, b is in the range of from 5 to 60, and c in the range of from 0 to 50 in atomic percentages. Further, the bulk-solidifying amorphous alloys can contain amounts of other transition metals up to 20% atomic, and more preferably metals such as Nb, Cr, V, Co. A preferable alloy family is $(Zr,Ti)_a(Ni,Cu)_b(Be)_c$, where a is in the range of from 40 to 75, b is in the range of from 5 to 50, and c in the range of from 5 to 50 in atomic percentages.

In still another embodiment, embodiment the bulk solidifying amorphous alloys comprise materials selected from the group described by the molecular equation: $(Zr,Ti)_a(Ni,Cu)_b(Be)_c$, where a is in the range of from 45 to 65, b is in the range of from 7.5 to 35, and c in the range of from 10 to 37.5 in atomic percentages. Another preferable alloy family is $(Zr)_a(Nb,Ti)_b(Ni,Cu)_c(Al)_d$, where a is in the range of from 45 to 65, b is in the range of from 0 to 10, c is in the range of from 20 to 40 and d in the range of from 7.5 to 15 in atomic percentages.

In yet another embodiment, the bulk-solidifying amorphous alloys are ferrous metals (Fe, Ni, Co) based compositions. One exemplary composition of such alloys is $Fe_{72}Al_5Ga_2P_{11}C_6B_4$.

In still yet another embodiment, the bulk-solidifying amorphous alloys contain a ductile crystalline phase precipitate.

In another embodiment, the reinforcement material is any material which is stable at greater temperatures than the melting temperatures of the bulk-solidifying amorphous alloy composition. In such an embodiment, the reinforcement material may comprise refractory metals such as tungsten, molybdenum, tantalum, niobium and their alloys; ceramics such as SiC, SiN, BC, TiC, WC, SiO2; and other refractory materials such as diamond, graphite and carbon fiber.

In another embodiment the current invention is directed to a method of forming bulk-solidifying amorphous composite materials comprising a densification step wherein the packing efficiency of the reinforcement material can be improved to provide the desired high density.

In still another embodiment, the feedstock is a blended mixture of reinforcement material and bulk solidifying amorphous alloy composition. In such an embodiment, the reinforcement material can be in a variety of forms such as wire, fiber, loose particulate, foam or sintered preforms.

In still yet another embodiment the packing density of the feedstock mixture is preferably 30% and higher and most preferably 50% and higher.

In still yet another embodiment, the feedstock mixture is blended and pressed under vacuum.

In still yet another embodiment, the provided feedstock mixture is canned and sealed under vacuum by a soft and malleable metal. In such an embodiment, the vacuum is preferably better than $10^{-3}$ Torr.

In still yet another embodiment, the bulk-solidifying amorphous alloy has a $\Delta T$ of larger than 60° C., and preferably larger than 90° C.

In still yet another embodiment, the densification step is carried out through an extrusion process above the melting temperature of the bulk-solidifying amorphous alloy composition.

In still yet another embodiment, the densification step is carried out by applying a hydro-static pressure above the melting temperature of the bulk-solidifying amorphous alloy composition.

In still yet another embodiment, the densification step is carried out through an hot-isostatic process (HIP) process above the melting temperature of the bulk-solidifying amorphous alloy composition.

In still yet another embodiment, the feedstock mixture is fully-densified having a packing efficiency greater than 99% and most preferably 100%.

In still yet another embodiment, the method comprises a first cooling step wherein the densified mixture is cooled sufficiently fast to retain substantially all of the amorphous structure of the bulk solidifying amorphous alloy composition. In such an embodiment, subsequently the densified mixture is heated and formed/shaped around or above the glass transition of temperature of bulk-solidifying amorphous alloy.

In still yet another embodiment, the forming/shaping step is carried out above the melting temperature. In such an embodiment, the re-heating of the densified mixture in the forming/shaping cycle may be extended to temperatures with an increased superheat of at least 50° C. above the temperatures used in the densification step.

In another embodiment, the reinforcement material is tungsten metal or particulate tungsten metal and comprises a volume fraction of greater than 75% of the densified composite material.

In yet another embodiment, the reinforcement material is particulate tungsten metal and comprises a volume fraction of greater than 85% in the densified composite material.

In still another embodiment, the reinforcement material is SiC, particulate SiC, or SiC fiber and comprises a volume fraction of greater than 75% in the densified composite material; or a volume fraction of greater than 85% in the densified composite material.

In still yet another embodiment, the reinforcement material is Diamond or synthetic diamond and comprises a volume fraction of greater than 75% in the densified composite material; or a volume fraction of greater than 85% in the densified composite material.

In still yet another embodiment, the reinforcement material is carbon fiber and comprises a volume fraction of greater than 50% in the densified composite material; or a volume fraction of greater than 75% in the densified composite material; or a volume fraction of greater than 85% in the densified composite material.

In still yet another embodiment, the composite material comprises reinforcement material at a volume fraction of greater than 75% in the densified composite material; or a volume fraction of greater than 85% in the densified composite material.

In another embodiment, the invention is directed to an article made of the composite material. In one such embodiment, the article is a cylindrical rod with an aspect ratio of greater than 10 (defined as length divided by diameter) and comprises tungsten metal as the reinforcement material at a volume fraction of greater than 75%. In another such embodiment, the article of composite material is a cylindrical rod with an aspect ratio of greater than 15.

In yet another embodiment, the article is at least 0.5 mm in all dimensions.

In still another embodiment, the article of composite material is a cylindrical rod with an aspect ratio of greater than 10 and with a diameter of at least 10 mm.

BRIEF DESCRIPTION OF THE DRAWINGS

These and other features and advantages of the invention will be apparent from the following detailed description, appended claims, and accompanying drawings, in which:

DETAILED DESCRIPTION OF THE INVENTION

The current invention is directed to a method of making composites of bulk-solidifying amorphous alloys, and articles made thereof, containing at least one type of reinforcement material, wherein the composite material preferably comprises a high volume fraction of reinforcement material and is fully-dense with minimum porosity. The materials according to this invention are referred to as "bulk-solidifying amorphous alloy matrix composites" herein.

Generally, there are three main objectives in processing and fabrication of amorphous alloy composites with high volume fraction of reinforcement material:

1) Achieving high packing density of the matrix and the reinforcement to minimize the porosity in the final product.

2) Retaining the amorphous state of the matrix alloy.

3) The ability to form the composite material into near-to-net shape objects with very low aspect ratios.

Unfortunately, it is not feasible to achieve all three objectives simultaneously. Accordingly, in the present process the steps of retaining the amorphous phase and/or forming near-to-net shape articles is delayed until after the composite material has been densified. Accordingly, it has been found that bulk solidifying amorphous alloy-matrix composite material having a high volume fraction of reinforcement material and with minimal porosity can be achieved.

Figure 1:
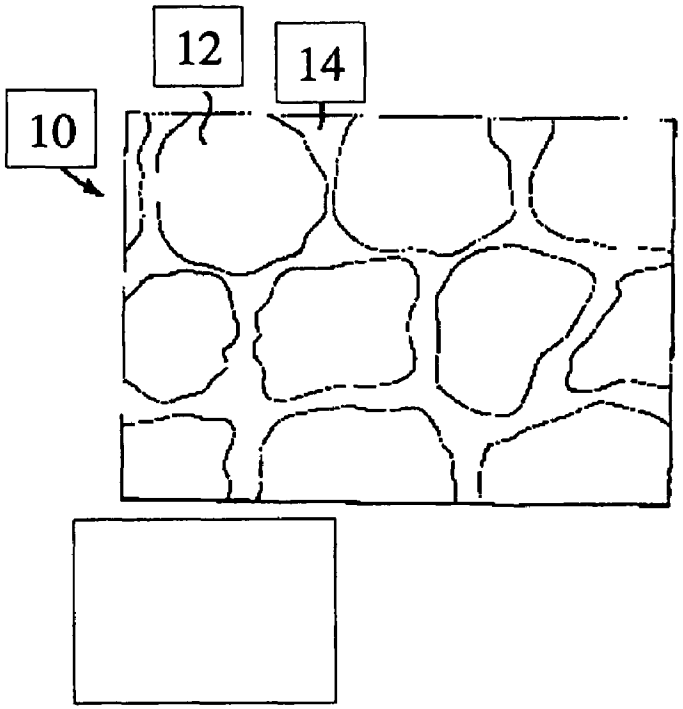
FIG. 1 is a schematic of an exemplary microstructure of an exemplary composite material according to the present invention.

A composite material generally refers to a material that is a heterogeneous mixture of two different material phases. FIG. 1 illustrates a microstructure of a bulk-solidifying composite material 10 made by the present approach. The composite material 10 is a mixture of two phases, a reinforcement phase 12 and a bulk-solidifying amorphous metal-matrix phase 14 that surrounds and bonds the reinforcement phase 12.

Although any mix of reinforcement particles may be utilized, in one exemplary embodiment a substantially uniform array of reinforcement particle phase within the metal-matrix phase is attained. Regardless of the distribution of particles, it is preferable that the reinforcement phase 12 occupies from about 50 to about 90 volume percent of the total of the reinforcement phase and the amorphous alloy-matrix phase, although phase percentages outside this range are operable. In a most preferred form of this embodiment, the reinforcement phase occupies greater than about 75% by volume percent of the total material; and in a most preferred embodiment the reinforcement phase occupies greater than about 85% by volume of the total material.

Turning to the bulk-solidifying materials 14 of the composites of the current invention. Bulk solidifying amorphous alloys are recently discovered family of amorphous alloys, which can be cooled at substantially lower cooling rates, of about 500 K/sec or less, and retain their amorphous atomic structure substantially. As such, they can be produced in thickness of 1.0 mm or more, substantially thicker than conventional amorphous alloys of typically 0.020 mm which require cooling rates of $10^5$ K/sec or more. U.S. Pat. Nos. 5,288,344; 5,368,659; 5,618,359; and 5,735,975 (the disclosure of each of which is incorporated herein by reference in its entirety) disclose such bulk solidifying amorphous alloys. A family of bulk solidifying amorphous alloys can be described as $(Zr,Ti)_a(Ni,Cu, Fe)_b(Be,Al,Si,B)_c$, where a is in the range of from 30 to 75, b is in the range of from 5 to 60, and c in the range of from 0 to 50 in atomic percentages. Furthermore, those alloys can accommodate substantial amounts of other transition metals up to 20% atomic, and more preferably metals such as Nb, Cr, V, Co. A preferable alloy family is $(Zr,Ti)_a(Ni,Cu)_b(Be)_c$, where a is in the range of from 40 to 75, b is in the range of from 5 to 50, and c in the range of from 5 to 50 in atomic percentages. Still, a more preferable composition is $(Zr,Ti)_a(Ni,Cu)_b(Be)_c$, where a is in the range of from 45 to 65, b is in the range of from 7.5 to 35, and c in the range of from 10 to 37.5 in atomic percentages. Another preferable alloy family is $(Zr)_a(Nb,Ti)_b(Ni,Cu)_c(Al)_d$, where a is in the range of from 45 to 65, b is in the range of from 0 to 10, c is in the range of from 20 to 40 and d in the range of from 7.5 to 15 in atomic percentages.

Another set of bulk-solidifying amorphous alloys are ferrous metals (Fe, Ni, Co) based compositions. Examples of such compositions are disclosed in U.S. Pat. No. 6,325,868, (A. Inoue et. al., Appl. Phys. Lett., Volume 71, p 464 (1997)), (Shen et. al., Mater. Trans., JIM, Volume 42, p 2136 (2001)), and Japanese patent application 2000126277 (Publ. #0.2001303218 A), all of which are incorporated herein by reference. One exemplary composition of such alloys is $Fe_{72}Al_5Ga_2P_{11}C_6B_4$. Another exemplary composition of such alloys is $Fe_{72}Al_7Zr_{10}Mo_5W_2B_{15}$. Although, these alloy compositions are not as processable to the degree of Zr-base alloy systems, they can be still be processed in thicknesses around 1.0 mm or more, sufficient enough to be utilized in the current invention.

Although any of the above bulk-solidifying amorphous alloys may be utilized, in one preferred embodiment the bulk-solidifying amorphous alloy has a $\Delta T$ of larger than 60° C. and preferably larger than 90° C. $\Delta T$ defines the extent of supercooled liquid regime above the glass transition temperature, to which the amorphous phase can be heated without significant crystallization in a typical Differential Scanning Calorimetry experiment.

In general, crystalline precipitates in bulk amorphous alloys are highly detrimental to their properties, especially to the toughness and strength, and as such generally preferred to a minimum volume fraction possible. However, there are cases in which, ductile crystalline phases precipitate in-situ during the processing of bulk amorphous alloys, which are indeed beneficial to the properties of bulk amorphous alloys especially to the toughness and ductility. Such bulk amorphous alloys comprising such beneficial precipitates are also included in the current invention. One exemplary case is disclosed in (C. C. Hays et. al, Physical Review Letters, Vol. 84, p 2901, 2000), the disclosure of which is incorporated herein by reference.

Turning now to the reinforcement material, the reinforcement phase 12 of the composite material 10 can be any material which is stable (i.e., having a melting temperature or sublimation point) at greater temperatures than the melting temperatures of the bulk-solidifying amorphous alloy composition. Preferably, the reinforcement material comprise refractory metals such as tungsten, molybdenum, tantalum, niobium and their alloys, ceramics such as SiC, SiN, BC, TiC, WC, SiO2 or other refractory materials such as diamond, graphite and carbon fiber.

Figure 2:
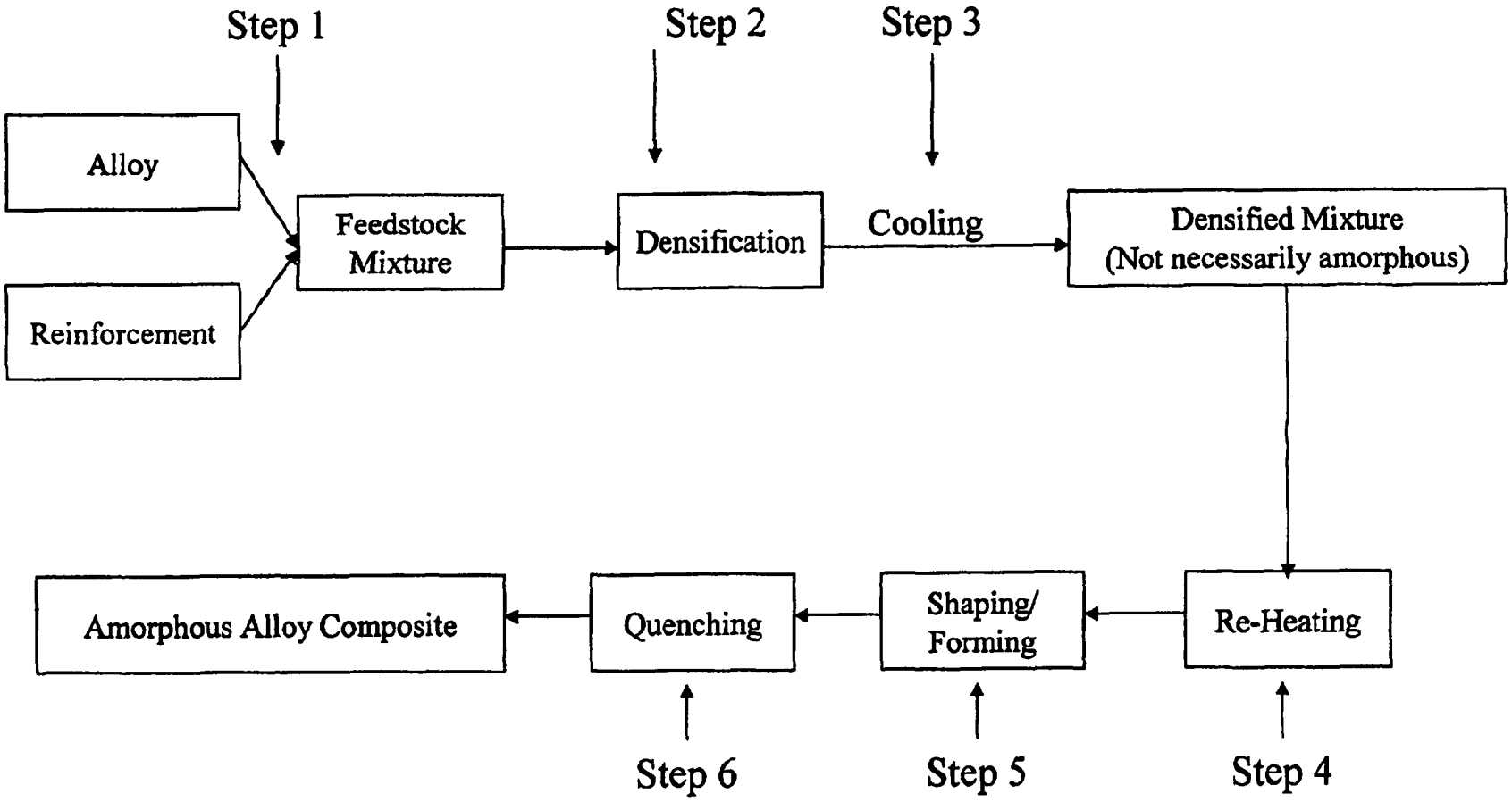
FIG. 2 is a flow chart of a method according to a second exemplary embodiment of the current invention.

The current invention is also directed to a method of making the composites described above. The method comprising the following steps: 1) providing a feedstock mixture of reinforcement material and bulk-solidifying amorphous alloy composition; 2) densifying the mixture by applying pressure above the melting temperature of the bulk-solidifying amorphous alloy composition; 3) cooling the densified mixture below the glass transition temperature of the bulk-solidifying amorphous alloy composition; 4) reheating the densified mixture above a forming temperature; 5) forming into the final a desired shape; and 6) quenching the formed article to ambient temperature. A flow-chart of this general method is provided in FIG. 2.

Although any feedstock (step 1) mixture of amorphous material and reinforcement material may be provided, the provided feedstock is preferably a blended mixture of reinforcement material and a feedstock of bulk solidifying amorphous alloy. In turn the reinforcement material can be in any suitable form, such as, for example wire, fiber, loose particulate, foam or sintered preforms. Likewise, although the feedstock of bulk-solidifying amorphous alloy is preferably in a pulverized form for improved blending with the reinforcement material, any form suitable for mixing may be utilized. The feedstock of bulk-solidifying amorphous alloy does not need to have an amorphous phase and it can be in its crystalline form. However, the chemical homogeneity of the pulverized particles of bulk-solidifying amorphous alloy composition is preferable. The packing density (or packing efficiency) of the feedstock mixture is preferably 30% and higher and most preferably 50% and higher.

The provided feedstock mixture may be blended and pressed under vacuum to aid the packing efficiency in the feedstock mixture. In one such embodiment, the feedstock mixture is canned and sealed under vacuum in a soft and malleable metal, which is stable (i.e., having a melting temperature or sublimation point) at greater temperatures than the melting temperatures of the bulk-solidifying amorphous alloy composition. Although any suitable pressure may be utilized, in one embodiment of the invention, the vacuum pressure is better than $10^{-3}$ Torr. Again although any suitable malleable metal may be utilized to can the feedstock, in one exemplary embodiment the can material is a stainless-steel or copper based metal.

In this process, during the densification step (2), the feedstock is heated such that the reinforcement material stays in solid form and the bulk-solidifying amorphous alloy composition is in the molten state. As a result, the molten alloy is able to flow around the reinforcement material and effectively lubricate the reinforcement material particles. Accordingly, when pressure is applied, the packing efficiency of the reinforcement material is improved such that a high packing density may be obtained. Although any temperature, pressure, and time of this process may be utilized, the superheat and the time of the densification process is preferably selected to minimize any undesirable reactions among the reinforcement material particles.

In one exemplary embodiment the densification step is carried out utilizing extrusion process above the melting temperature of the bulk-solidifying amorphous alloy composition. However, the densification step may be carried out using any suitable technique, such as, for example, by applying a hydro-static pressure above the melting temperature of the bulk-solidifying amorphous alloy composition, or alternatively by a hot-isostatic process (HIP) process above the melting temperature of the bulk-solidifying amorphous alloy composition.

In one, most preferred embodiment of the invention, during the densification step (2), the feedstock mixture is fully-densified having a packing efficiency greater than 99% and most preferably near about 100%.

Figure 3:
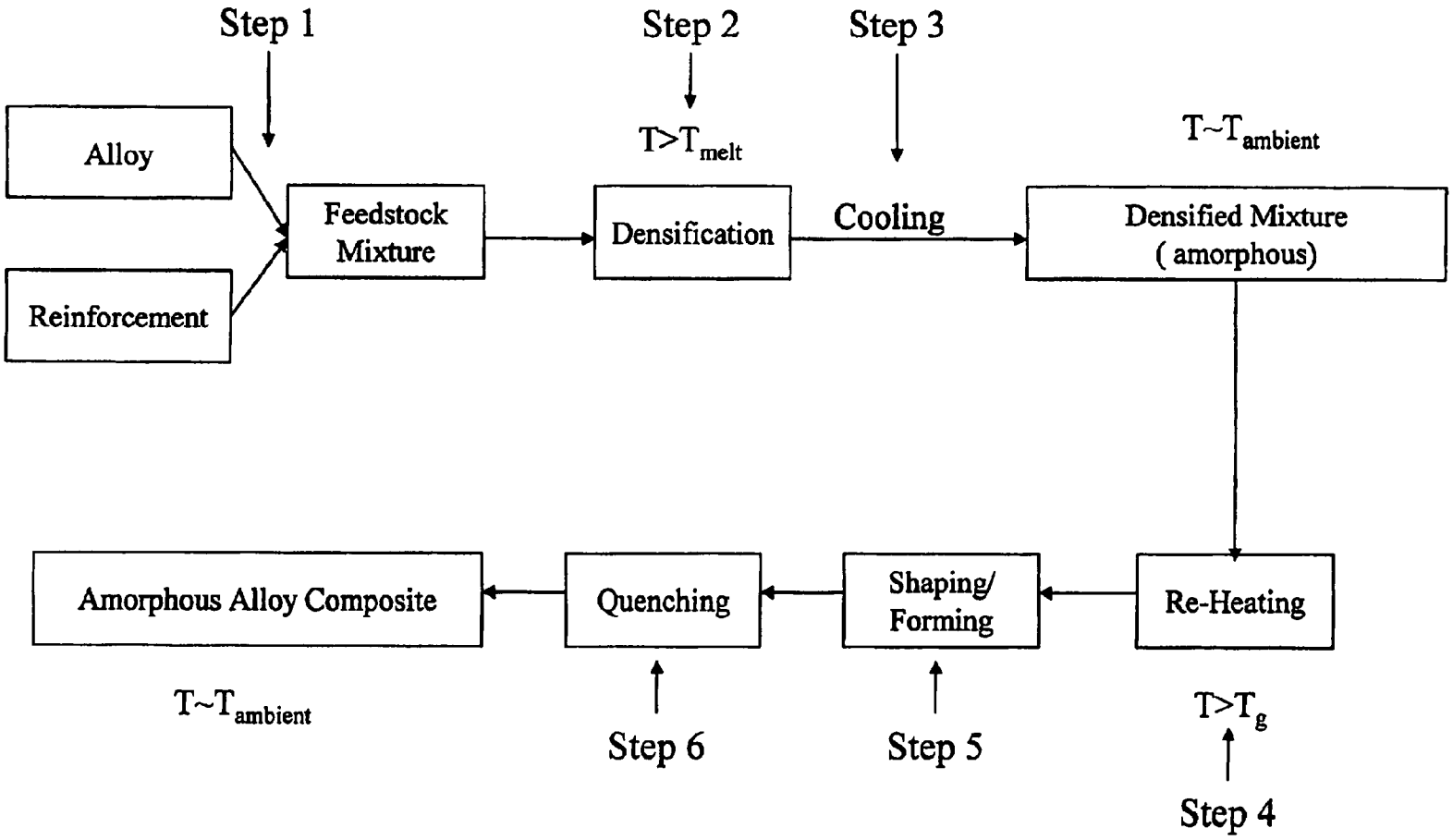
FIG. 3 is a flow chart of a method according to one exemplary embodiment of the current invention.

In one embodiment of the invention, as shown in the flow-chart in FIG. 3, during the first cooling step (3), the densified mixture is cooled sufficiently fast to substantially retain the amorphous structure of the bulk solidifying amorphous alloy composition. In such an embodiment, subsequently, a re-heating step (4) is performed where the densified mixture is heated and formed/shaped (5) around or above the glass transition of temperature of bulk-solidifying amorphous alloy such that crystallization of the amorphous material does not occur.

Figure 4:
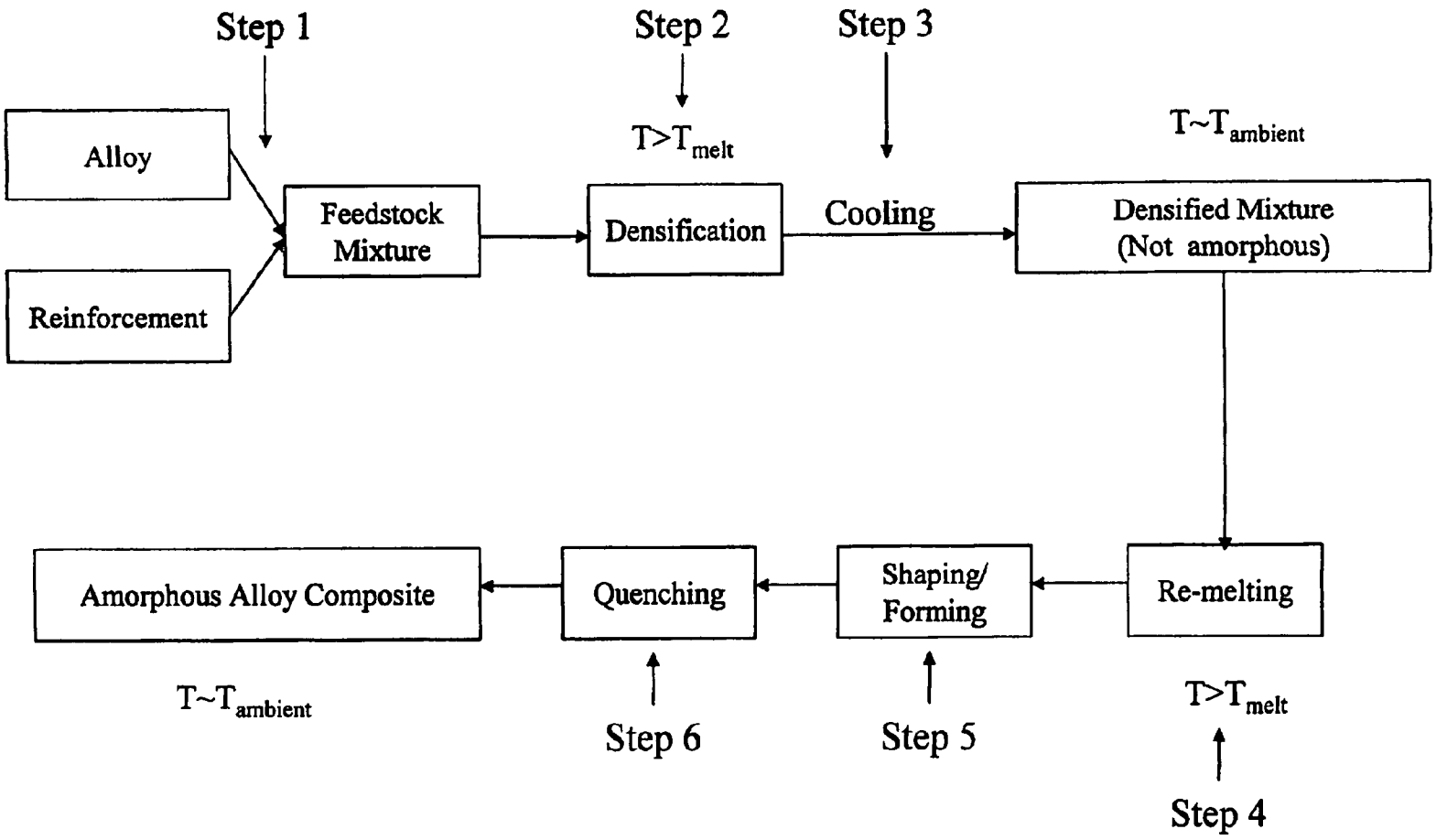
FIG. 4 is a flow chart of a method according to a second exemplary embodiment of the current invention.

However, in the embodiment of the invention shown as a flow-chart in FIG. 4, the cooling rate of the first cooling step is not sufficient to form the amorphous phase in the bulk-solidifying amorphous alloy, in this second embodiment, the second heating cycle is extended above the melting temperature of bulk-solidifying amorphous alloy. As such, the forming step (5) is carried out above the melting temperature. In this second embodiment, in the final quenching step (6), the formed object must be cooled sufficiently fast to form the amorphous structure of the bulk solidifying amorphous alloy composition such that an object is formed comprising a bulk-solidifying amorphous composite material.

In one specific embodiment of the invention shown as a flow-chart in Figure, the heating of the densified mixture in the forming/shaping step (5) may be extended to temperatures with an increased superheat of at least 50° C. above the temperatures used in the densification step.

In another specific embodiment of the invention shown as a flow-chart in Figure, the re-heating cycle of the densified mixture in the forming/shaping step (5) is carried at substantially shorter time than of the densification step.

In another specific embodiment of the invention shown as a flow-chart in Figure, the re-heating cycle of the densified mixture in the forming/shaping step (5) is carried at temperatures of at least 50° C. above the temperature of densification step; and at substantially shorter time than of the densification step.

In one embodiment of the invention, the aspect ratio of the fully densified mixture is increased by a factor of at least twice in the forming/shaping step. In another embodiment of the invention, the aspect ratio of the fully densified mixture is decreased by a factor of at least twice in the forming/shaping step.

The invention is also directed to an article made by the material and process described above. Although any size and shaped article may be made, in one embodiment of the invention, the article made of the composite material is a cylindrical rod with an aspect ratio of greater than 10 (defined as length divided by diameter) and comprises tungsten metal as the reinforcement material at a volume fraction of greater than 75%. In another preferred embodiment of the invention, the article of composite material is a cylindrical rod with an aspect ratio of greater than 15 (defined as length divided by diameter) and comprises tungsten metal as the reinforcement material at a volume fraction of greater than 75%.

Again although any suitable dimensions may be utilized, in one embodiment of the invention, the article of composite material is at least 0.5 mm in all dimensions. In another embodiment of the invention, the article of the composite material is an article of "extreme" aspect ratio, whereas one or two dimensions of the article is substantially larger (or smaller) than the other dimensions of the article. In one such embodiment of the invention, the article of the composite material is a cylindrical rod with an aspect ratio of greater than 10 (where the length is 10 times or more of the diameter). In such an embodiment, the rob may and have a diameter of at least 10 mm. In another such embodiment of the invention, the article of the composite material is a disc with an aspect ratio of less than 0.1 (where the diameter of the disc is 0.1 times or less of the thickness).

Finally, although only tungsten metal reinforcement materials are discussed above, in another embodiment of the invention, the article or at least a portion of the article of the composite material comprises lightweight-hard particles—such as SiC, SiN, BC, TiC, diamond—as the reinforcement material at a volume fraction of greater than 75%. Alternatively, the reinforcement material may comprise lightweight-strong fibers—such as SiC, at a volume fraction of greater than 75%.

Although specific embodiments are disclosed herein, it is expected that persons skilled in the art can and will design alternative bulk-solidifying composites and methods to produce the bulk-solidifying composites that are within the scope of the following description either literally or under the Doctrine of Equivalents.

What is claimed is:

1. A method of forming a dense reinforcement-containing bulk solidifying amorphous alloy-matrix composite material comprising:

providing a feedstock of a bulk solidifying amorphous alloy having the capability of retaining an amorphous state when cooled from above its melting temperature at a critical cooling rate of no more than about 500° C./s;

dispersing and blending a plurality of pieces of a reinforcement material with the bulk solidifying amorphous alloy feedstock under vacuum to form a blended mixture of reinforcement material and bulk solidifying amorphous alloy feedstock having a packing density of at least 30% prior to densification;

heating the mixture to a densification temperature above the melting temperature of the bulk solidifying amorphous alloy and below the melting temperature of the reinforcement material;

densifying the mixture by applying a force to the mixture at the densification temperature for a specified densification time;

cooling the densified mixture below the glass transition temperature of the bulk solidifying amorphous alloy to form a solidified composite material;

reheating the solidified composite mixture to a forming temperature for a period of time less than the densification time, wherein said forming temperature is at least 50° C. higher than the densification temperature;

forming the reheated composite mixture into a desired shape at the forming temperature;

and quenching the reheated mixture to an ambient temperature to form an amorphous alloy-matrix composite material.

2. The method as described in claim 1 wherein the cooling of the densified mixture is carried out at a cooling rate no less than the critical cooling rate such that the bulk solidifying amorphous alloy matrix of the solidified composite material is substantially amorphous, and wherein the forming temperature is between the glass transition temperature of the bulk solidifying amorphous alloy and the crystallization temperature of the bulk solidifying amorphous alloy.

3. The method as described in claim 1 wherein the cooling of the densified mixture is carried out at a cooling rate less than the critical cooling rate such that the bulk solidifying amorphous alloy matrix of the solidified composite material is substantially crystalline, and wherein the quenching of the reheated mixture is carried out at a cooling rate no less than the critical cooling rate such that the amorphous alloy-matrix composite material is substantially amorphous.

4. The method as described in claim 1 wherein the bulk solidifying amorphous alloy has a supercooled liquid regime of larger than 60° C.

5. The method as described in claim 1 wherein the bulk solidifying amorphous alloy has a supercooled liquid regime of larger than 90° C.

6. The method as described in claim 1 wherein the bulk solidifying amorphous alloy is described by the molecular equation: $(Zr,Ti)_a(Ni,Cu,Fe)_b(Be,Al,Si,B)_c$, where a is in the range of from 30 to 75, b is in the range of from 5 to 60, and c in the range of from 0 to 50 in atomic percentages.

7. The method as described in claim 1 wherein the bulk solidifying amorphous alloy is described by the molecular equation: $(Zr,Ti)_a(Ni,Cu)_b(Be)_c$, where a is in the range of from 40 to 75, b is in the range of from 5 to 50, and c in the range of from 5 to 50 in atomic percentages.

8. The method as described in claim 1 wherein the bulk solidifying amorphous alloy is described by the molecular equation: $(Zr)_a(Nb,Ti)_b(Ni,Cu)_C(Al)_d$, where a is in the range of from 45 to 65, b is in the range of from 0 to 10, c is in the range of from 20 to 40 and d in the range of from 7.5 to 15 in atomic percentages.

9. The method as described in claim 1 wherein the bulk solidifying amorphous alloy contains a ductile crystalline phase precipitate.

10. The method as described in claim 1 wherein the reinforcement material is stable at temperatures at least greater than the melting temperature of the bulk solidifying amorphous alloy.

11. The method as described in claim 1 wherein the reinforcement material contains at least one refractory metal selected from the group consisting of tungsten, molybdenum, tantalum, niobium and their alloys.

12. The method as described in claim 1 wherein the reinforcement material contains at least one material selected from the group consisting of SiC, SiN, BC, TiC, WC, SiO2, diamond, graphite and carbon fiber.

13. The method as described in claim 1 wherein the reinforcement material takes a form selected from the group consisting of wire, fiber, loose particulate, foam and sintered preforms.

14. The method as described in claim 1 wherein the packing density of the pre-densification mixture is at least 50%.

15. The method as described in claim 1 wherein the step of applying a force occurs under vacuum.

16. The method as described in claim 1 wherein the step of applying a force includes extruding the mixture at a temperature above the melting temperature of the bulk-solidifying amorphous alloy.

17. The method as described in claim 1 wherein the step of applying a force includes applying a hydro-static pressure to the mixture at a temperature above the melting temperature of the bulk-solidifying amorphous alloy.

18. The method as described in claim 1 wherein the step of applying a force includes carrying out a hot-isostatic process on the mixture at a temperature above the melting temperature of the bulk-solidifying amorphous alloy.

19. The method as described in claim 1 wherein the step of applying a force forms a densified mixture having a packing density of greater than 99%.

20. The method as described in claim 1 wherein the reinforcement material comprises a volume fraction of the solidified composite material of greater than 75%.

*21. A method comprising:*

*blending a plurality of pieces of a reinforcement material with a bulk solidifying amorphous alloy under vacuum to form a blended mixture of the reinforcement material and the bulk solidifying amorphous alloy, wherein the blended mixture has a packing density of at least 30%;*

*heating the blended mixture to a densification temperature above the melting temperature of the bulk solidifying amorphous alloy and below the melting temperature of the reinforcement material;*

*densifying the blended mixture by applying a force to the blended mixture at the densification temperature for a densification time to form a densified mixture; and*

*forming a solidified composite material at a forming temperature for a period of time less than the densification time, wherein said forming temperature is at least 50° C. higher than the densification temperature.*

*22. The method of claim 21, wherein a cooling of the densified mixture is carried out at a cooling rate no less than a critical cooling rate, such that the bulk solidifying amorphous alloy of the solidified composite material is substantially amorphous, and wherein the forming temperature is between the glass transition temperature of the bulk solidifying amorphous alloy and the crystallization temperature of the bulk solidifying amorphous alloy.*

*23. The method of claim 21, wherein a cooling of the densified mixture is carried out at a cooling rate less than a critical cooling rate, such that the bulk solidifying amorphous alloy of the solidified composite material is substantially crystalline, and wherein a quenching of a reheated mixture is carried out at a cooling rate no less than the critical cooling rate such that the solidified composite material is substantially amorphous.*

*24. The method of claim 21, wherein the bulk solidifying amorphous alloy has a supercooled liquid regime of larger than 60° C.*

*25. The method of claim 21, wherein the bulk solidifying amorphous alloy is described by the molecular equation:*

$$(Zr,Ti)_a(Ni,Cu,Fe)_b(Be,Al,Si,B)_c,$$

*where a is in the range of from 30 to 75, b is in the range of from 5 to 60, and c in the range of from 0 to 50 in atomic percentages.*

*26. The method of claim 21, wherein the bulk solidifying amorphous alloy contains a ductile crystalline phase precipitate.*

*27. The method of claim 21, wherein the reinforcement material contains at least one refractory metal selected from the group consisting of tungsten, molybdenum, tantalum, niobium and their alloys.*

*28. The method of claim 21, wherein the reinforcement material takes a form selected from the group consisting of wire, fiber, loose particulate, foam and sintered preforms.*

*29. The method of claim 21, wherein the applying a force includes (i) extruding the blended mixture; (ii) applying a hydro-static pressure to the blended mixture; or (iii) carrying out a hot-isostatic process on the blended mixture at a temperature above the melting temperature of the bulk solidifying amorphous alloy.*

*30. The method of claim 21, wherein the reinforcement material is stable at temperatures at least greater than the melting temperature of the bulk solidifying amorphous alloy; or*

*wherein the reinforcement material contains at least one material selected from the group consisting of SiC, SiN, BC, TiC, WC, $SiO_2$, diamond, graphite and carbon fiber; or*

*wherein the reinforcement material comprises a volume fraction of the solidified composite material of greater than 75%.*

* * * * *